US011890244B2

(12) United States Patent
Su

(10) Patent No.: US 11,890,244 B2
(45) Date of Patent: Feb. 6, 2024

(54) WHEELED NURSING AND MEDICAL DEVICE

(71) Applicant: Chung-Hsiu Su, Kaohsiung (TW)

(72) Inventor: Chung-Hsiu Su, Kaohsiung (TW)

( * ) Notice: Subject to any disclaimer, the term of this patent is extended or adjusted under 35 U.S.C. 154(b) by 175 days.

(21) Appl. No.: 17/698,737

(22) Filed: Mar. 18, 2022

(65) Prior Publication Data

US 2023/0293371 A1 Sep. 21, 2023

(51) Int. Cl.

| | |
|---|---|
| ***A61G 7/16*** | (2006.01) |
| ***A61G 7/015*** | (2006.01) |
| ***A61G 7/018*** | (2006.01) |
| ***A61G 7/05*** | (2006.01) |
| ***A61G 7/07*** | (2006.01) |
| ***A61G 5/00*** | (2006.01) |
| ***A61G 5/10*** | (2006.01) |
| ***A61G 7/075*** | (2006.01) |

(52) U.S. Cl.

CPC ............... *A61G 7/16* (2013.01); *A61G 5/006* (2013.01); *A61G 5/101* (2013.01); *A61G 5/1018* (2013.01); *A61G 7/015* (2013.01); *A61G 7/018* (2013.01); *A61G 7/0528* (2016.11); *A61G 7/07* (2013.01); *A61G 7/0755* (2013.01); *A61G 2200/327* (2013.01); *A61G 2200/34* (2013.01)

(58) Field of Classification Search

None

See application file for complete search history.

(56) References Cited

U.S. PATENT DOCUMENTS

| | | | | |
|---|---|---|---|---|
| 2016/0302986 A1* | 10/2016 | Haladova | ............... | A61G 7/015 |
| 2019/0350780 A1* | 11/2019 | Zerhusen | ................. | A61G 7/08 |
| 2020/0397147 A1* | 12/2020 | Ren | ...................... | A47C 20/041 |
| 2021/0085550 A1* | 3/2021 | Lim | ....................... | A61G 13/08 |
| 2022/0183907 A1* | 6/2022 | Liu | ........................ | A61G 7/053 |

FOREIGN PATENT DOCUMENTS

TW I760146 B * 3/2021

* cited by examiner

*Primary Examiner* — Justin C Mikowski
*Assistant Examiner* — Adam C Ortiz
(74) *Attorney, Agent, or Firm* — MUNCY, GEISSLER, OLDS & LOWE, P.C.

(57) ABSTRACT

A wheeled nursing and medical device includes a wheeled seat mechanism, a driving module, a bed mechanism and a linking mechanism. The wheeled seat mechanism includes an expandable base frame and front and rear wheel assemblies. The driving module is operable to drive expanding and retraction of the expandable base frame. The bed mechanism includes a main bed plate and a backrest plate pivotally connected with the main bed plate. The linking mechanism includes at least one inclined bracket pivotally connected with the expandable base frame and the backrest plate. The device is shiftable between a bed state and a wheelchair state to render traveling of the device in the wheelchair state convenient.

9 Claims, 14 Drawing Sheets

WHEELED NURSING AND MEDICAL DEVICE

FIELD

The disclosure relates to a wheeled nursing and medical device, and more particularly to a wheeled nursing and medical device shiftable between a bed state and a wheelchair state.

BACKGROUND

A conventional hospital bed generally has a backrest portion which is turnable upwardly relative to a main bed portion in a manually or electrically operated manner for facilitating a patient's lying or sitting on the bed. However, since the length of the bed frame on which front and rear casters are mounted is fixed, it is troublesome to make the hospital bed travel. A sufficient space in the original room and hallway for placing and transferring the hospital bed is required to move the hospital bed, and a dedicated elevator and/or a dedicated vehicle is required to move the hospital bed from the original room to the destination. Even if there is not enough space, the patient still must be transported to a wheelchair, which renders use of the hospital bed inconvenient and also causes the weak and disabled patient uncomfortableness.

SUMMARY

Therefore, an object of the disclosure is to provide a wheeled nursing and medical device that can alleviate at least one of the drawbacks of the prior art.

According to the disclosure, the wheeled nursing and medical device includes a wheeled seat mechanism, a driving module, a bed mechanism and a linking mechanism. The wheeled seat mechanism includes an expandable base frame which extends in a lengthwise front-rear direction, a front wheel assembly which is mounted on a front side of the expandable base frame, and a rear wheel assembly which is mounted on a rear side of the expandable base frame and spaced apart from the front wheel assembly. The driving module is mounted on the expandable base frame and is operable to drive expanding and retraction of the expandable base frame in the lengthwise front-rear direction. The bed mechanism includes a main bed plate which is securely mounted on the wheeled seat mechanism, and a backrest plate which is pivotally connected with a rear side of the main bed plate to be turnable upwardly relative to the main bed plate. The linking mechanism includes at least one inclined bracket which has lower and upper ends that are respectively and pivotally connected with the rear side of the expandable base frame and a front side of the backrest plate. When the driving module is operated to drive the retraction of the expandable base frame, the rear wheel assembly is moved forwardly relative to the front wheel assembly while the lower end of the at least one inclined bracket is moved forwardly to bring the upper end of the inclined bracket to press and turn the backrest plate upwardly so as to shift the wheeled nursing and medical device from a bed state, where the backrest plate is placed parallel to and flush with the main bed plate, to a wheelchair state.

The wheeled nursing and medical device is shiftable between the bed state and the wheelchair state. In the wheelchair state, the distance between the front and rear wheel assemblies is smaller than the distance therebetween in the bed state such that the entire length of the device is efficiently shortened, which renders traveling of the device in the wheelchair state convenient.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
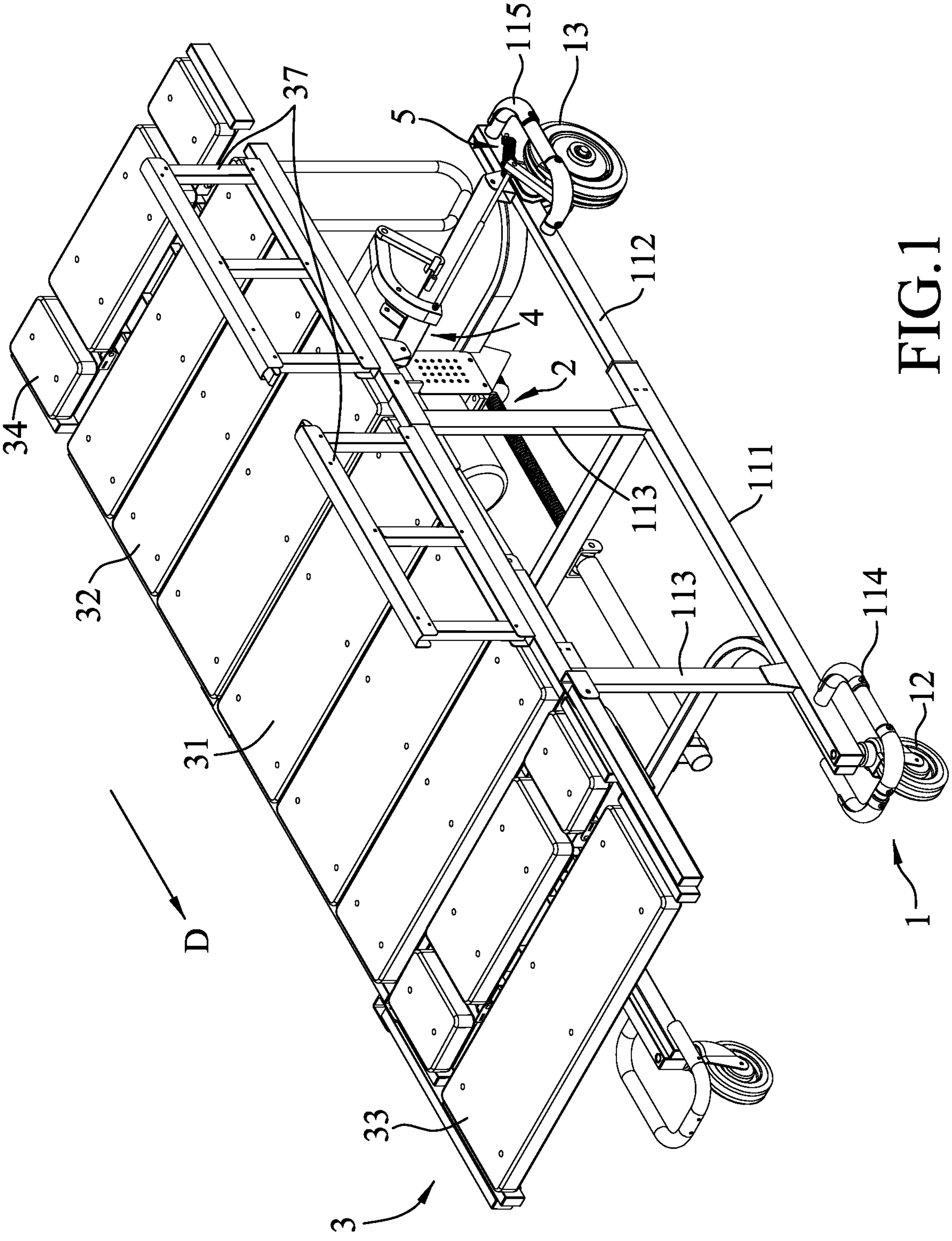
FIG. 1 is a perspective view illustrating an embodiment of a wheeled nursing and medical device according to the disclosure in a bed state.
Figure 2:
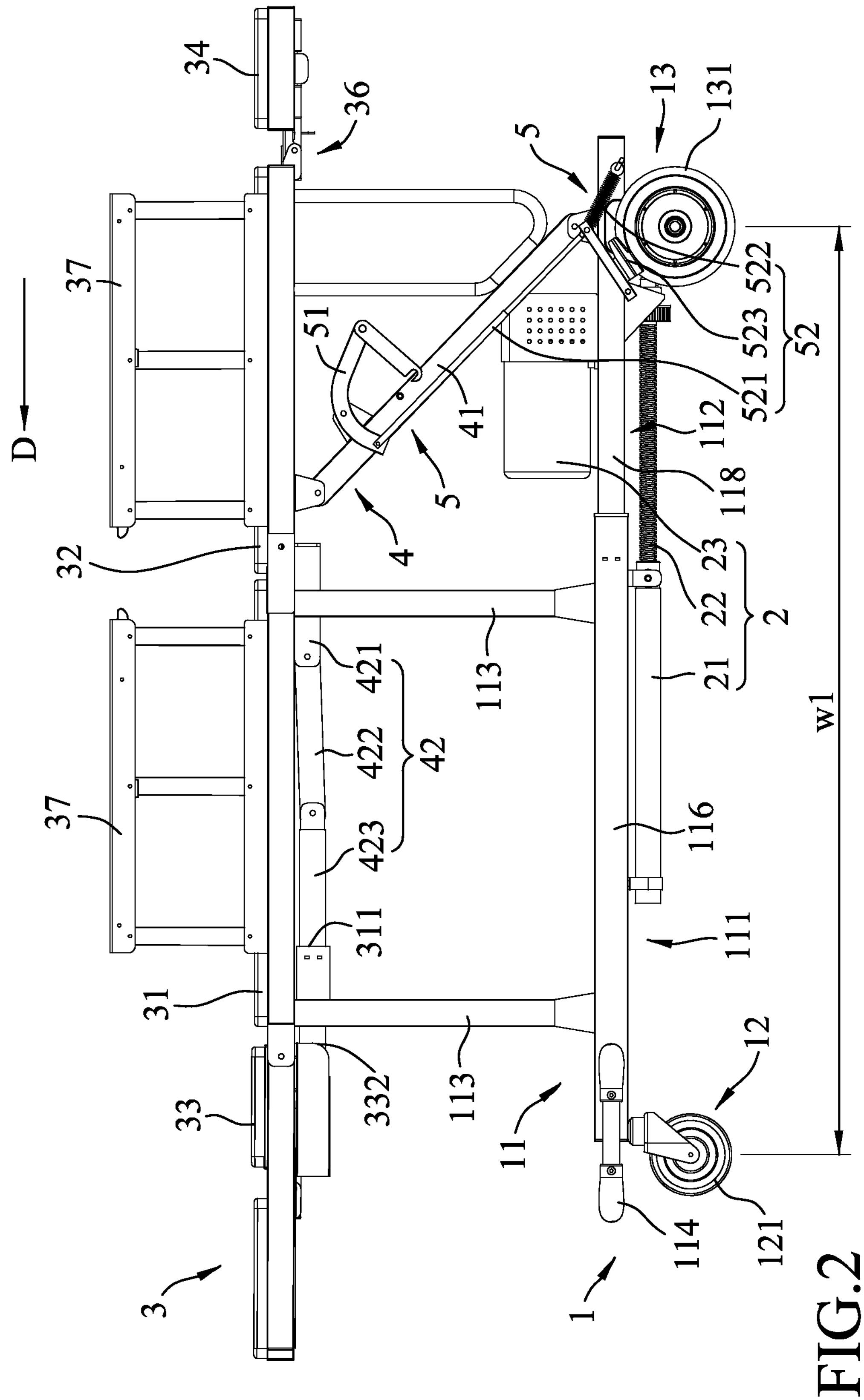
FIG. 2 is a side view illustrating the embodiment in the bed state, a rear protective frame body being removed for sake of clarity.
Figure 3:
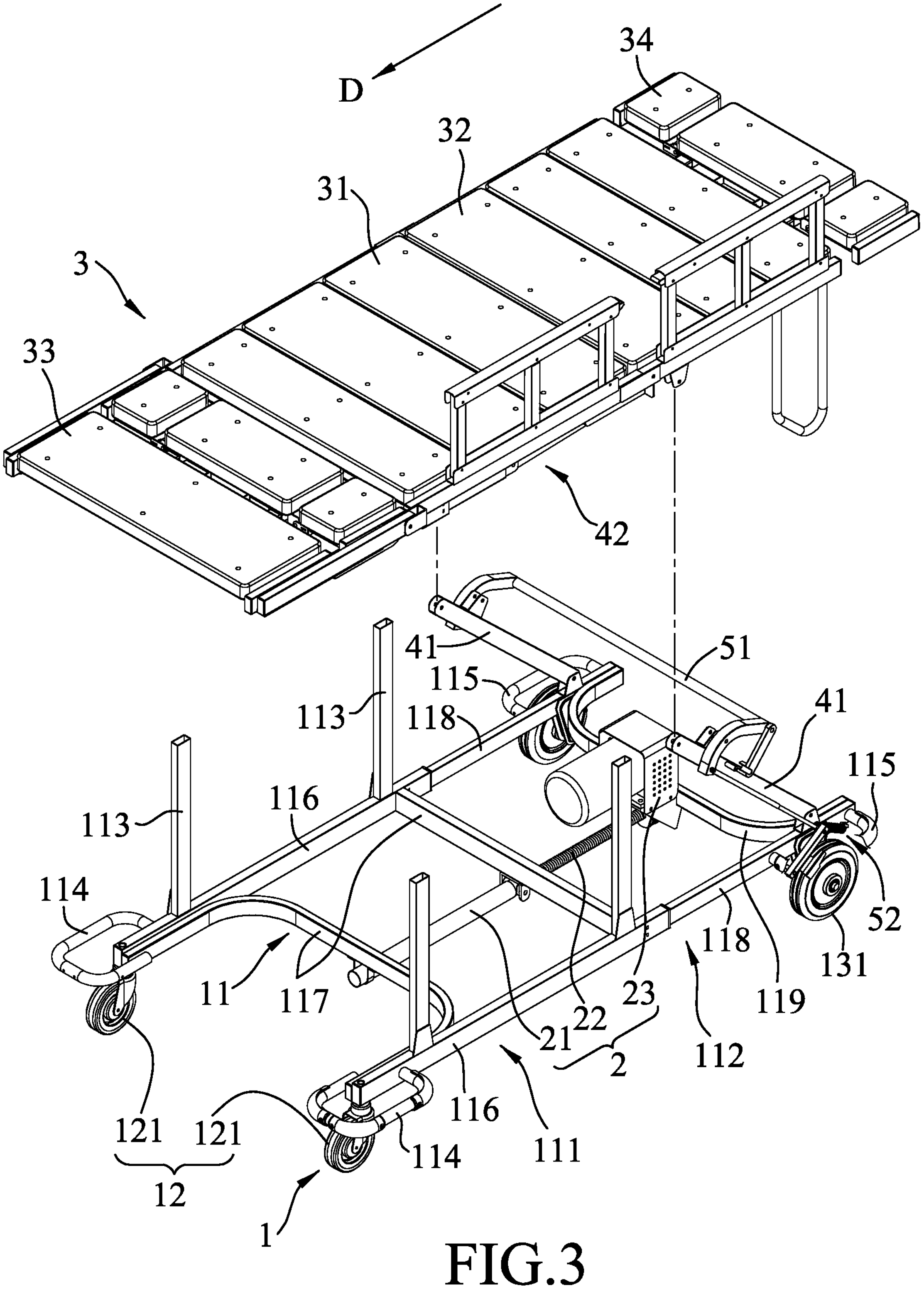
FIG. 3 is a partly-exploded perspective view of the embodiment, a portion of the rear protective frame body being removed.

Referring to FIGS. 1 to 3, an embodiment of a wheeled nursing and medical device according to the disclosure is shiftable between a bed state (see FIG. 1) for a patient to lie thereon, and a wheelchair state (see FIG. 12) for a patient to sit thereon, and includes a wheeled seat mechanism 1 extending in a lengthwise front-rear direction (D), a driving module 2 mounted on the wheeled seat mechanism 1 and operable to drive motion of the wheeled seat mechanism 1, a bed mechanism 3 mounted on the wheeled seat mechanism 1, a linking mechanism 4 linking between the wheeled seat mechanism 1 and the bed mechanism 3, and a brake mechanism 5. In this embodiment, the lengthwise front-rear direction (D) refers to the extension position of the bed state when the wheeled nursing and medical device is positioned for a patient to lie thereon.

Figure 4:
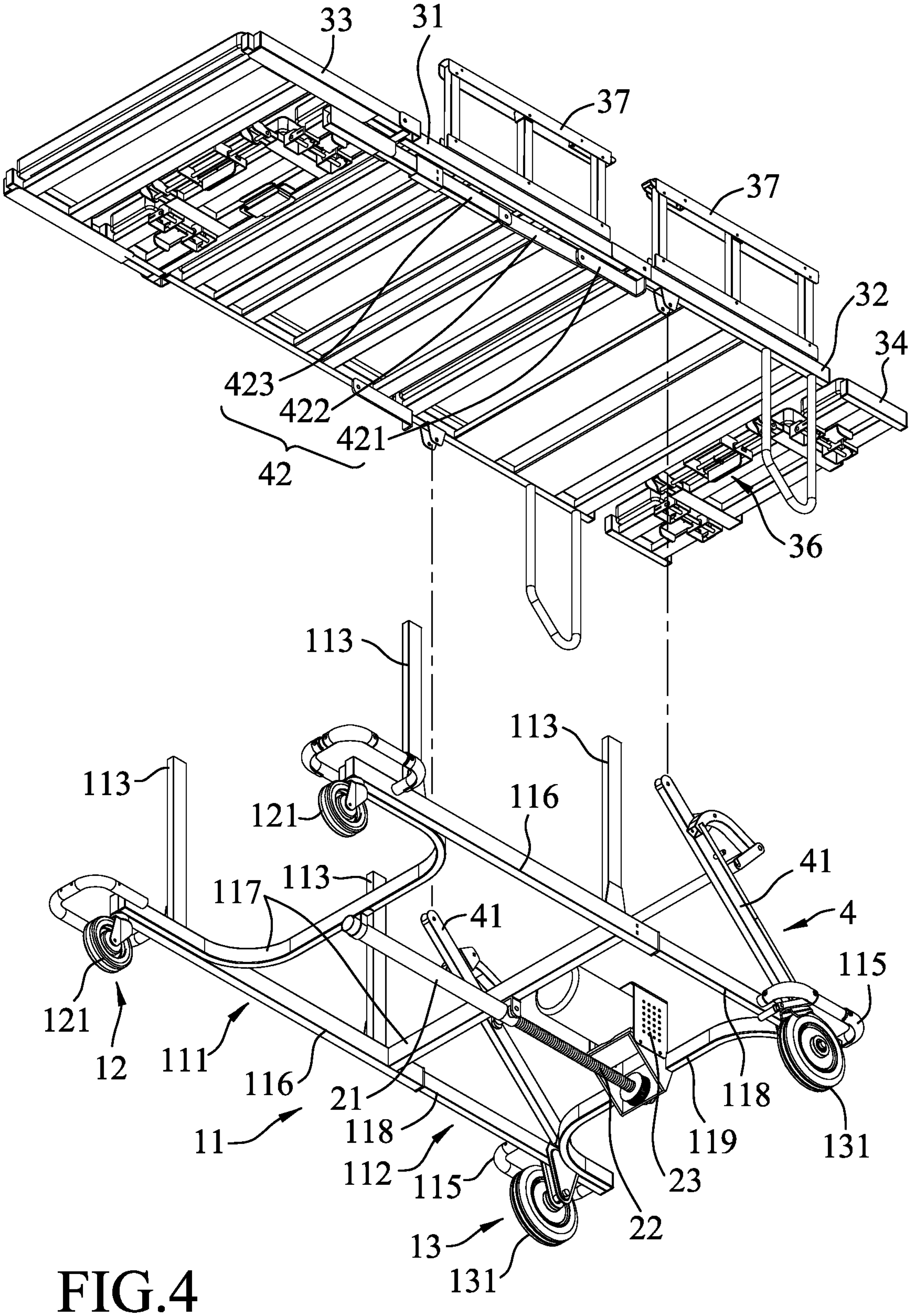
FIG. 4 is an exploded perspective view of the embodiment, viewed from another angle.

With reference to FIGS. 2 to 4, the wheeled seat mechanism 1 includes an expandable base frame 11 which extends in the lengthwise front-rear direction (D), a front wheel assembly 12 which is mounted on a front side of the expandable base frame 11, and a rear wheel assembly 13 which is mounted on a rear side of the expandable base frame 11 and spaced apart from the front wheel assembly 12 by a first distance (w1) in the bed state.

The expandable base frame 11 includes a fixed frame body 111, an expandable frame body 112 which is connected with and movable relative to a rear side of the fixed frame body 111 in the lengthwise front-rear direction (D), four erecting posts 113 which are securely mounted on four corners of the fixed frame body 111 and extend uprightly, two U-shaped front protective frame bodies 114 which are mounted on left and right ends of a front side of the fixed frame body 111, and two C-shaped rear protective frame bodies 115 which are mounted on left and right ends of a rear side of the expandable frame body 112.

The fixed frame body 111 includes two fixed tubular sleeves 116 which are spaced apart from each other in a left-right direction, and two fixed crosspieces 117 which are connected between the fixed tubular sleeves 116 and spaced apart from each other in the lengthwise front-rear direction (D). The fixed crosspiece 117 at a front side is of a C-shape, and the fixed crosspiece 117 at a rear side is in the form of a straight bar. The expandable frame body 112 includes two movable tubes 118 which are spaced apart from each other in the left-right direction and respectively and movably inserted into rear sides of the fixed tubular sleeves 116 in the lengthwise front-rear direction (D), and a connecting crosspiece 119 which is connected between rear sides of the movable tubes 118. Hence, the expandable frame body 112 is driven to move relative to the fixed frame body 111 in the lengthwise front-rear direction (D) so as to expand or retract the expandable base frame 11 in the lengthwise front-rear direction (D). The front wheel assembly 12 has two front wheels 121 which are respectively mounted on front sides of the fixed tubular sleeves 116 of the fixed frame body 111 and symmetric to each other in the left-right direction. Each front wheel 121 is surrounded by the respective front protective frame body 114 for preventing colliding. The rear wheel assembly 13 has two rear wheels 131 which are respectively mounted on the rear sides of the movable tubes 118 of the expandable frame body 112 and symmetric to each other in the left-right direction. Each rear wheel 131 is surrounded by the respective rear protective frame body 115 for preventing colliding.

The driving module 2 includes a fixed tube 21 which is securely mounted on an underside of the fixed crosspieces 117 of the fixed frame body 111 and extends in the lengthwise front-rear direction (D), a threaded shaft 22 which has a front portion threadedly engaged with the fixed tube 21 to be rotatable and movable relative to the fixed tube 21 in the lengthwise front-rear direction (D), and a driving member 23 which is securely mounted on the connecting crosspiece 119 of the expandable frame body 112 and coupled with a rear portion of the threaded shaft 22 to be operable to drive rotation and movement of the threaded shaft 22 so as to move the expandable frame body 112 relative to the fixed frame body 111 to drive expanding and retraction of the expandable base frame 11 in the lengthwise front-rear direction (D).

In this embodiment, the driving member 23 is a driving motor. Alternatively, the driving member 23 may be a gear train to provide a mechanical drive to rotate the threaded shaft 22.

The bed mechanism 3 includes a rectangular main bed plate 31 which is securely mounted on the erecting posts 113, a rectangular backrest plate 32 which is pivotally connected with a rear side of the main bed plate 31 to be turnable upwardly relative to the main bed plate 31, a rectangular leg rest plate 33 which is pivotally connected with a front side of the main bed plate 31 to be turnable downwardly relative to the main bed plate 31 and which has an insert slot 332 formed in a lower side thereof, a headrest plate 34 which is pivotally connected with a rear side of the backrest plate 32 to be turnable upwardly relative to the backrest plate 32, an adjusting unit 36 which is connected between the backrest plate 32 and the headrest plate 34, and two armrests 37 which are foldably mounted on two opposite sides of the main bed plate 31 and the backrest plate 32. In this embodiment, upward turning and downward turning refer to the turning direction of the wheeled nursing and medical device in the bed state.

Figure 6:
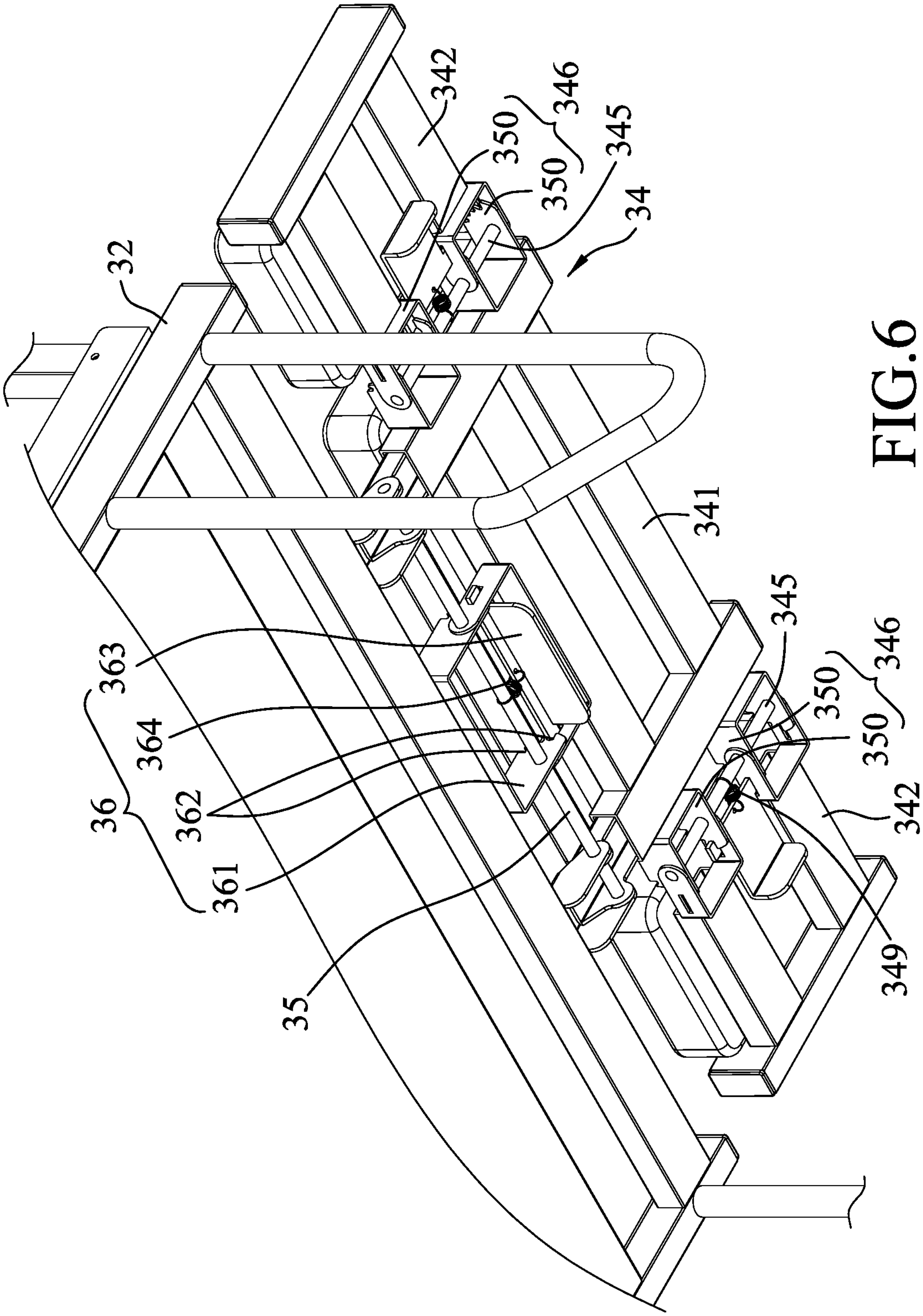
FIG. 6 is a fragmentary perspective view of the embodiment, illustrating an adjusting unit disposed between a headrest plate and a backrest plate.
Figure 7:
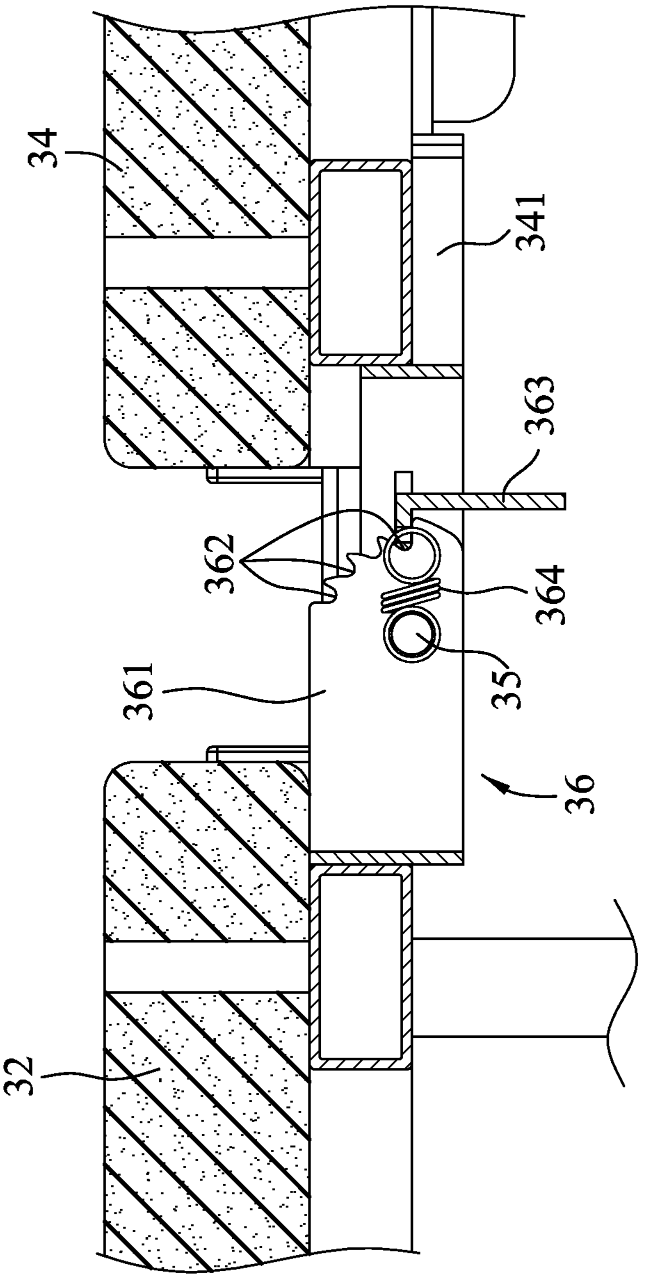
FIG. 7 is a fragmentary sectional view illustrating the adjusting unit, the headrest plate and the backrest plate.
Figure 8:
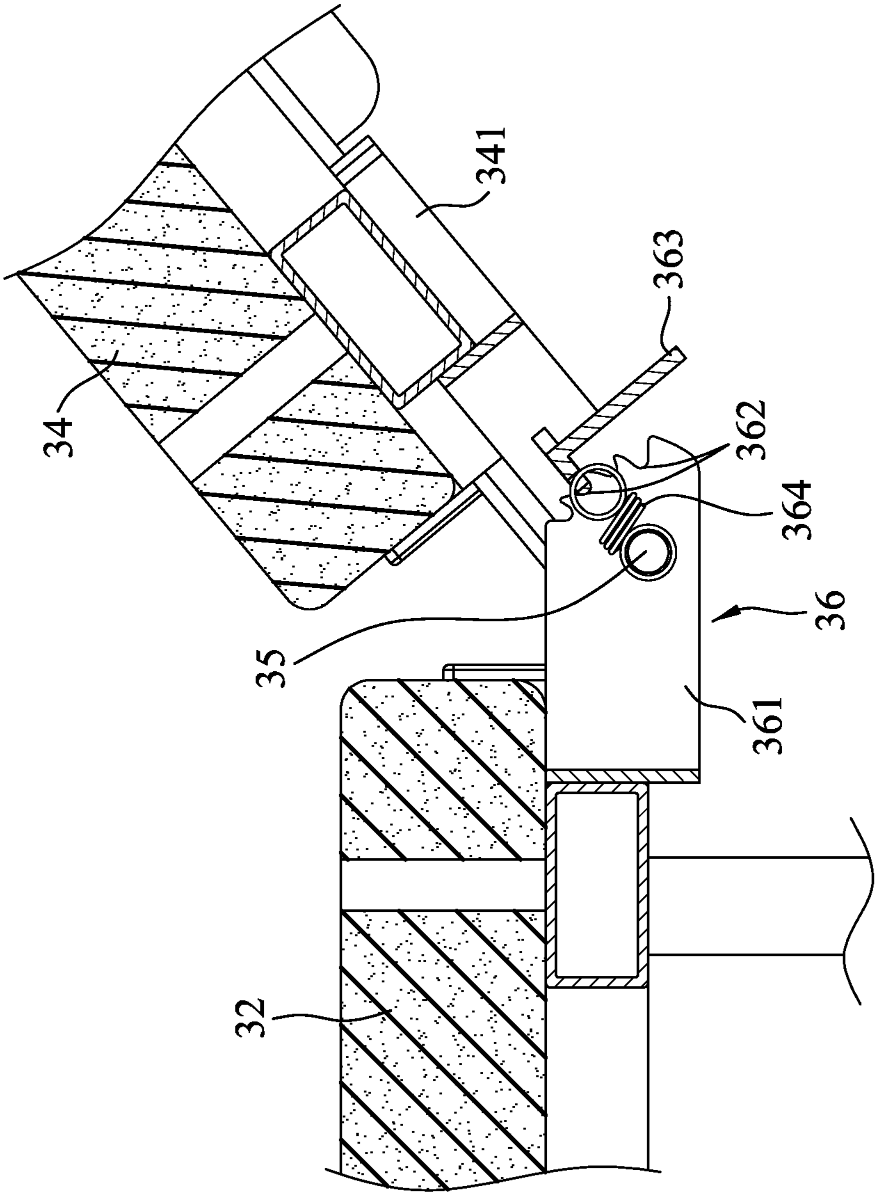
FIG. 8 is a fragmentary sectional view illustrating a state when an inclined angle of the headrest plate is adjusted relative to the backrest plate.

With reference to FIGS. 6 to 8, the headrest plate 34 has a headrest portion 341 which is pivotally connected with the backrest plate 32 by a first pivot piece 35, and two lateral wing portions 342 which are respectively and adjustably connected with left and right sides of the headrest portion 341 so that an inclined angle of the lateral wing portions 342 relative to the headrest portion 341 is adjustable.

The adjusting unit 36 includes a positioning seat 361 which is securely mounted on the rear side of the backrest plate 32 for the first pivot piece 35 to extend therethrough and has a plurality of positioning grooves 362, a positioning block 363 which is securely mounted on the headrest portion 341 and is engageable with a selected one of the positioning grooves 362, and a first biasing member 364 which is connected between the positioning block 363 and the first pivot piece 35 to bias the positioning block 363 toward the positioning grooves 362. With the engagement of the positioning block 363 with the selected one of the positioning grooves 362, an inclined angle of the headrest plate 34 is adjustable relative to the backrest plate 32 and the headrest plate 34 can be kept in a desired angular position (as shown in FIG. 8).

Figure 9:
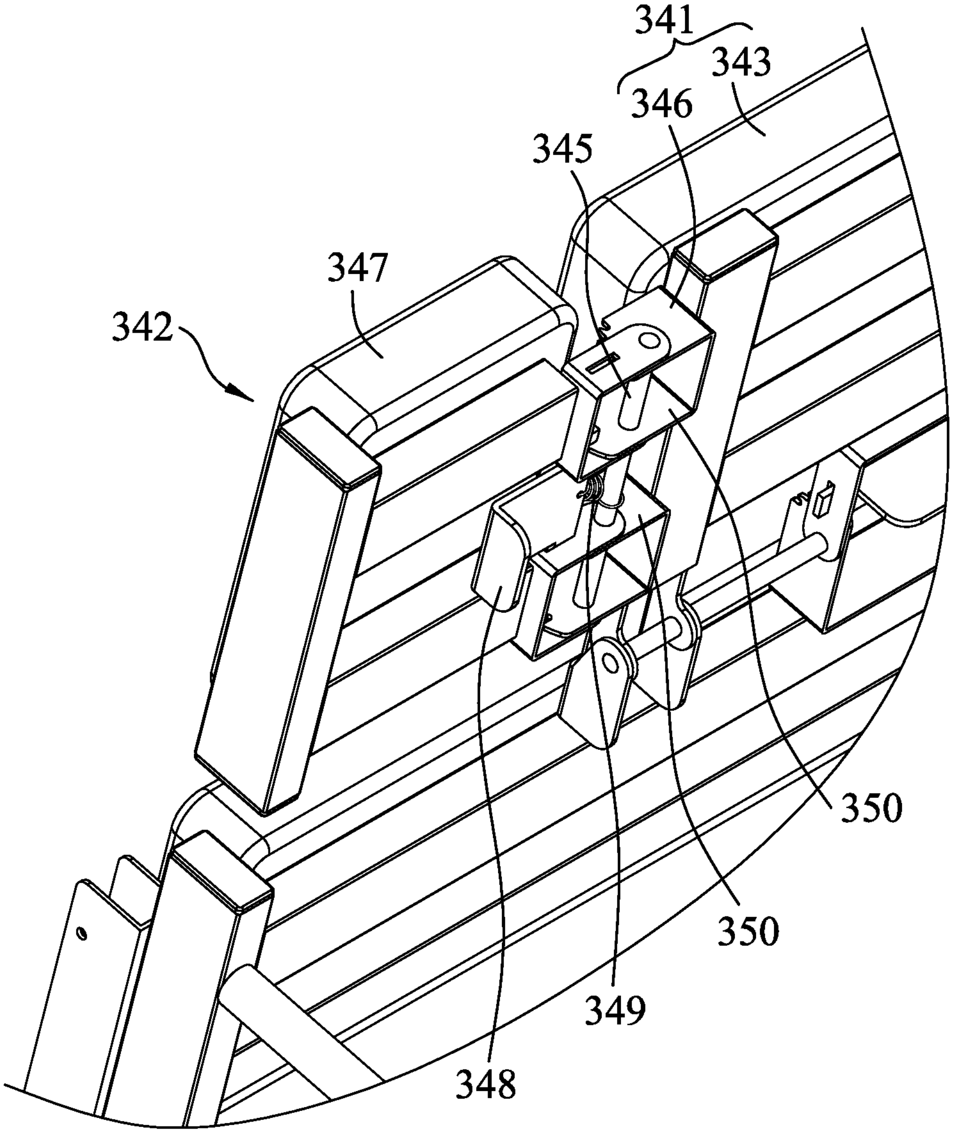
FIG. 9 is a fragmentary perspective view illustrating the headrest plate.
Figure 10:
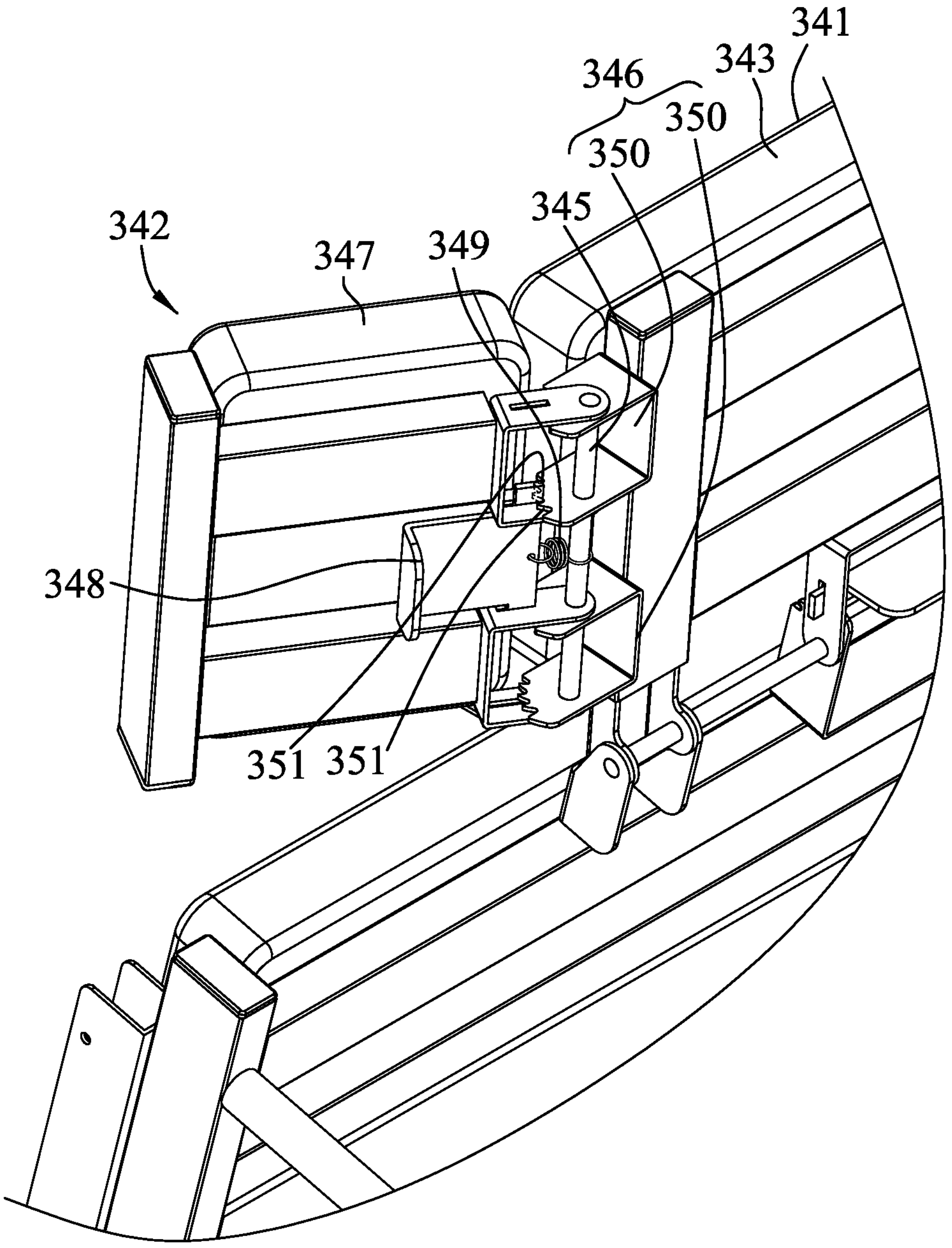
FIG. 10 is a fragmentary perspective view illustrating a state when an inclined angle of two lateral wing portions of the headrest plate is adjusted relative to a headrest portion of the headrest plate.

With reference to FIGS. 6, 9 and 10, the headrest portion 341 has a headrest frame 343 and two positioning brackets 346 which are respectively and pivotally connected with left and right sides of the headrest frame 343 by two second pivot pieces 345 and symmetric to each other in the left-right direction. Each positioning bracket 346 has two positioning seats 350 for the respective second pivot piece 345 to extend therethrough and having a plurality of positioning grooves 351. Each lateral wing portion 342 includes a wing frame 347, a positioning block 348 which is securely mounted on the wing frame 347 and is engageable with a selected one of the positioning grooves 351 of the respective positioning bracket 346, and a second biasing member 349 which is connected between the positioning block 348 and the corresponding second pivot piece 345 to bias the positioning block 348 toward the positioning grooves 351. With the engagement of the positioning block 348 with the selected one of the positioning grooves 351, an inclined angle of the lateral wing portions 342 is adjustable relative to the headrest portion 341 and the lateral wing portions 342 can be kept in a desired angular position.

Figure 5:
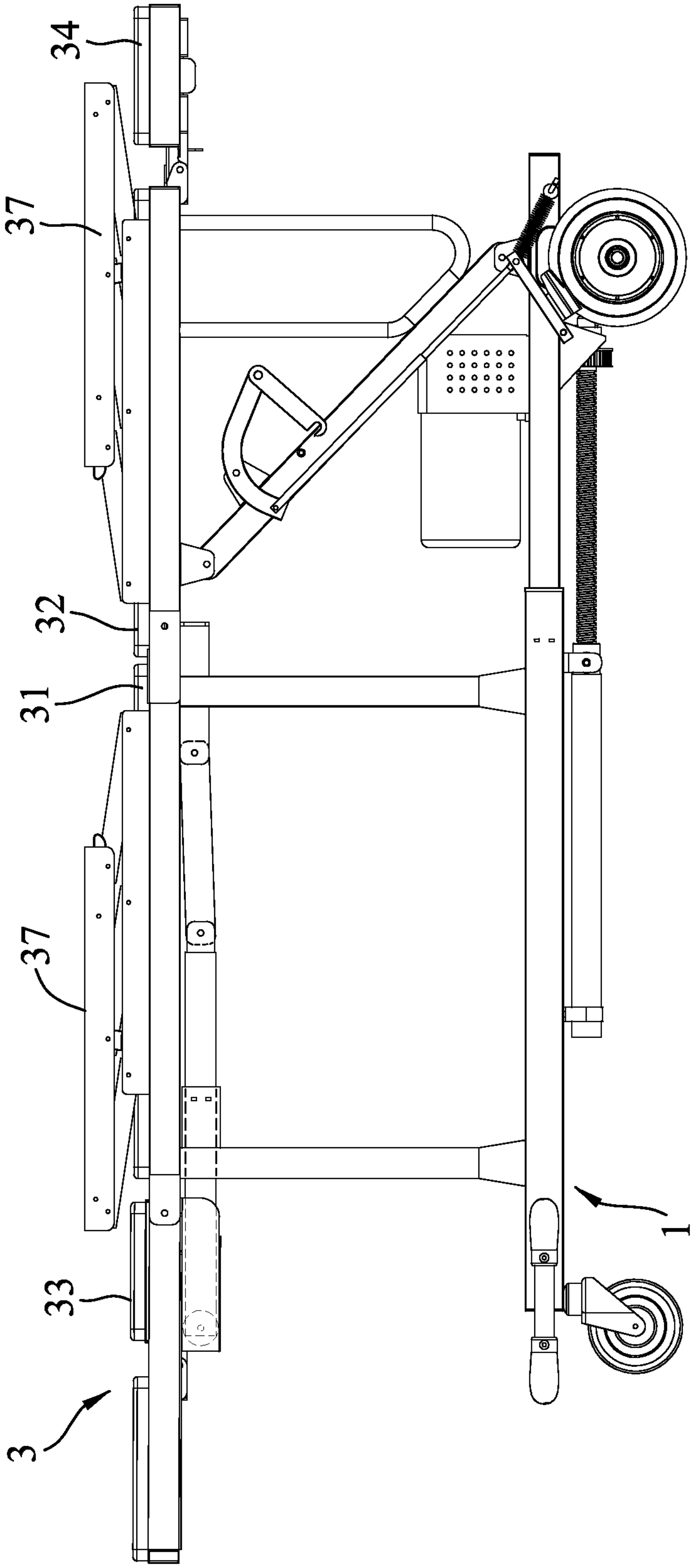
FIG. 5 is a side view illustrating the embodiment in a state when two armrests are folded.

With reference to FIGS. 1 and 5, the armrests 37 are unfolded and folded relative to the bed mechanism 3, and are mounted at right sides of the main bed plate 31 and the backrest plate 32, as shown in FIG. 1.

With reference to FIGS. 2 to 4, the linking mechanism 4 includes two inclined brackets 41 which are symmetric to each other in the left-right direction, and a linking assembly 42 which is mounted on a right underside of the bed mechanism 3. Each inclined bracket 41 has lower and upper ends which are respectively and pivotally connected with the rear side of the expandable base frame 11 and a front side of the backrest plate 32. The linking assembly 42 has a linking plate 421 which is securely mounted on the front underside of the backrest plate 32 and extends forwardly below the main bed plate 31, a pivot shaft 422 which is pivotally connected with a front end of the linking plate 421, and a linking bar 423 which is pivotally connected with a front end of the pivot shaft 422 and slidably engaged with lower portions of the main bed plate 31 and the leg rest plate 33 in the lengthwise front-rear direction (D). In this embodiment, the linking bar 423 is slidably engaged in a sliding slot 311 of the lower portion of the main bed plate 31 in the lengthwise front-rear direction (D).

The brake mechanism 5 includes a control lever 51 which is pivotally connected with the inclined brackets 41 to be turned downwardly, and two brake assemblies 52 (only one brake assembly 52 is shown in FIG. 2) which are disposed at left and right ends of the control lever 51. Each of the brake assemblies 52 has a brake piece 523 which abuts against a respective one of the rear wheels 131, a transmitting rod 521 which has upper and lower ends respectively and pivotally connected with the control lever 51 and the brake piece 523 to be moved upwardly with the downward turning of the control lever 51 to disengage the brake piece 523 from the rear wheel 131, and a biasing member 522 which is connected between the transmitting rod 521 and the rear side of the respective movable tube 118 of the expandable frame body 112 to bias the transmitting rod 521 downwardly.

Figure 11:
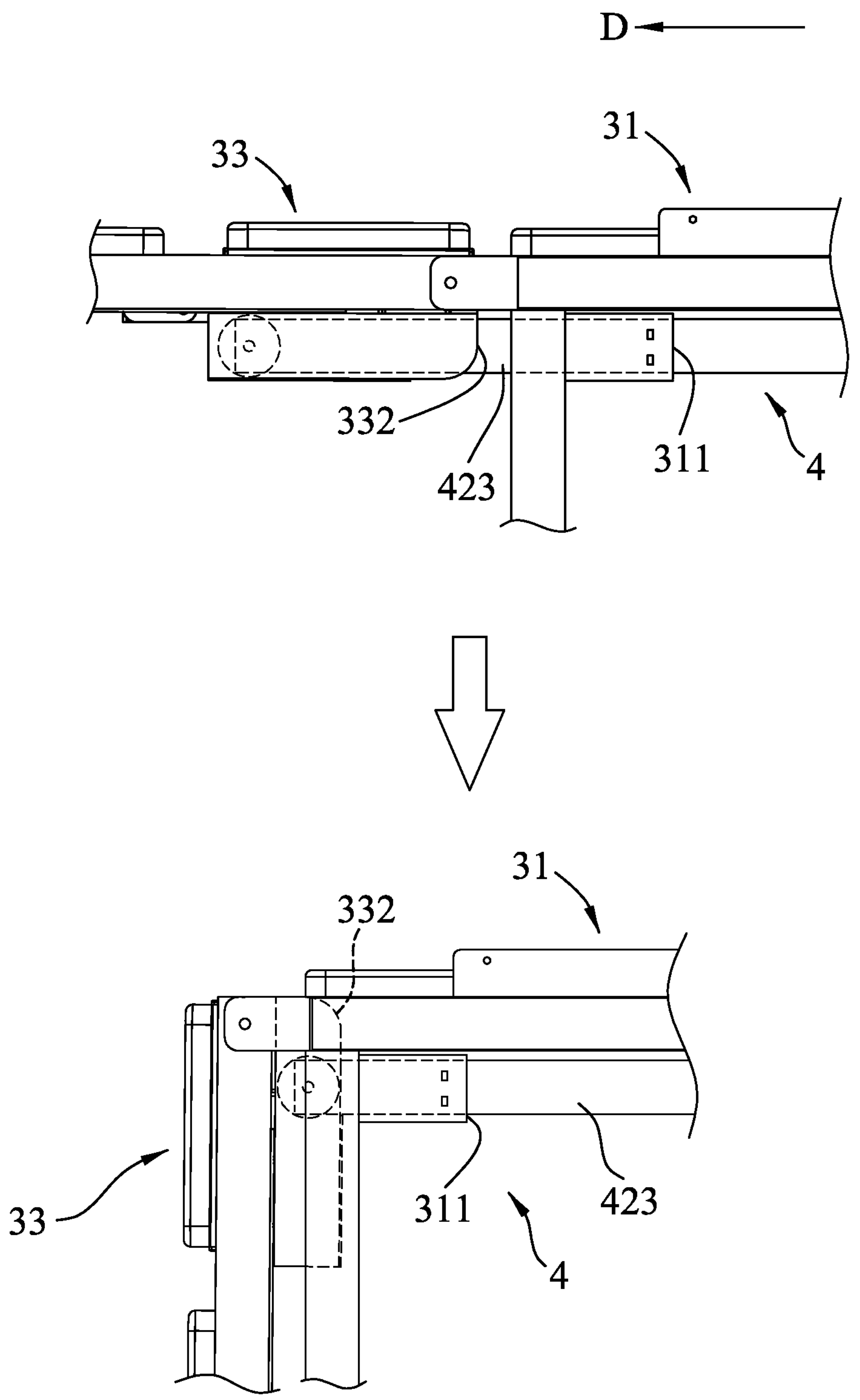
FIG. 11 is fragmentary schematic view illustrating a state when a linking bar is moved rearwardly away from a leg rest plate.
Figure 12:
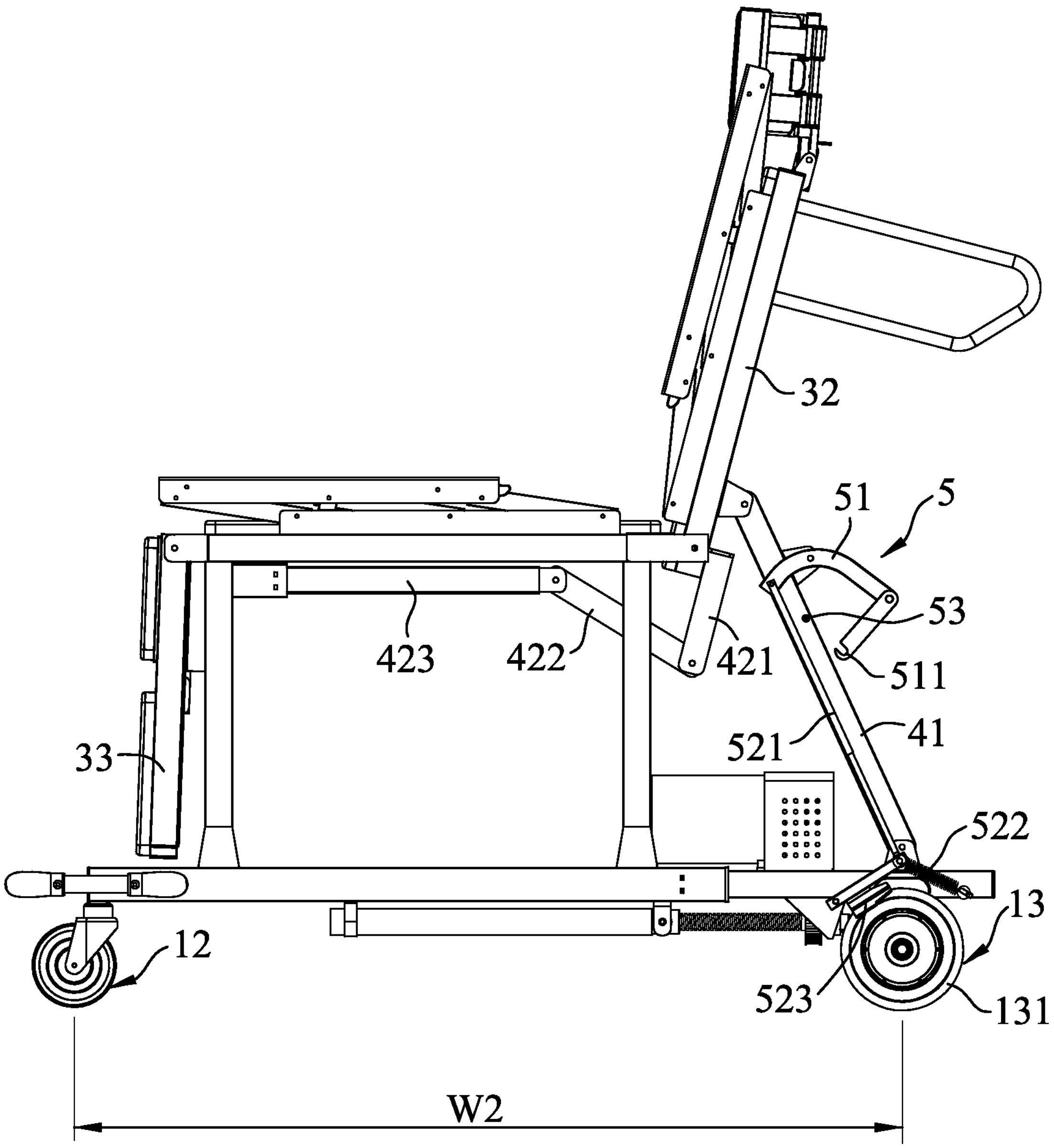
FIG. 12 is a side view illustrating the embodiment in a wheelchair state, the rear protective frame body being removed.

With reference to FIGS. 3, 11 and 12, in the bed state (see FIG. 2), the backrest plate 32 is placed parallel to and flush with the main bed plate 31, and the linking bar 423 extends in the lengthwise front-rear direction (D) and projects into the insert slot 332 under the leg rest plate 33 to brace the leg rest plate 33 so as to bring the leg rest plate 33 parallel to and flush with the main bed plate 31. During the shifting of this embodiment from the bed state to the wheelchair state, the operator, such as a health care worker, operates the driving member 23 to rotate and move the threaded shaft 22 relative to the fixed tube 21 such that the movable tubes 118 of the expandable frame body 112 and the rear wheels 131 are moved forwardly and synchronously relative to the fixed tubular sleeves 116 to shorten the length of the expandable base frame 11 and the distance (w2) between the front and rear wheel assemblies 12, 13. At the same time, the lower ends of the inclined brackets 41 are moved forwardly to bring the upper ends of the inclined bracket 41 to press and turn the backrest plate 32 upwardly and to turn the front end of the linking plate 421 downwardly to bring the linking bar 423 through the pivot shaft 422 to move rearwardly so as to release bracing of the leg rest plate 33 to permit downward swinging of the leg rest plate 33. Thus, the wheeled nursing and medical device is shifted to the wheelchair state (as shown in FIG. 12).

Similarly, when it is desired to shift back to the bed state, the driving member 23 is operated to rotate and move the threaded shaft 22 in an opposite direction. It is noted that, in various embodiments, only one inclined bracket 41 may be provided.

Figure 13:
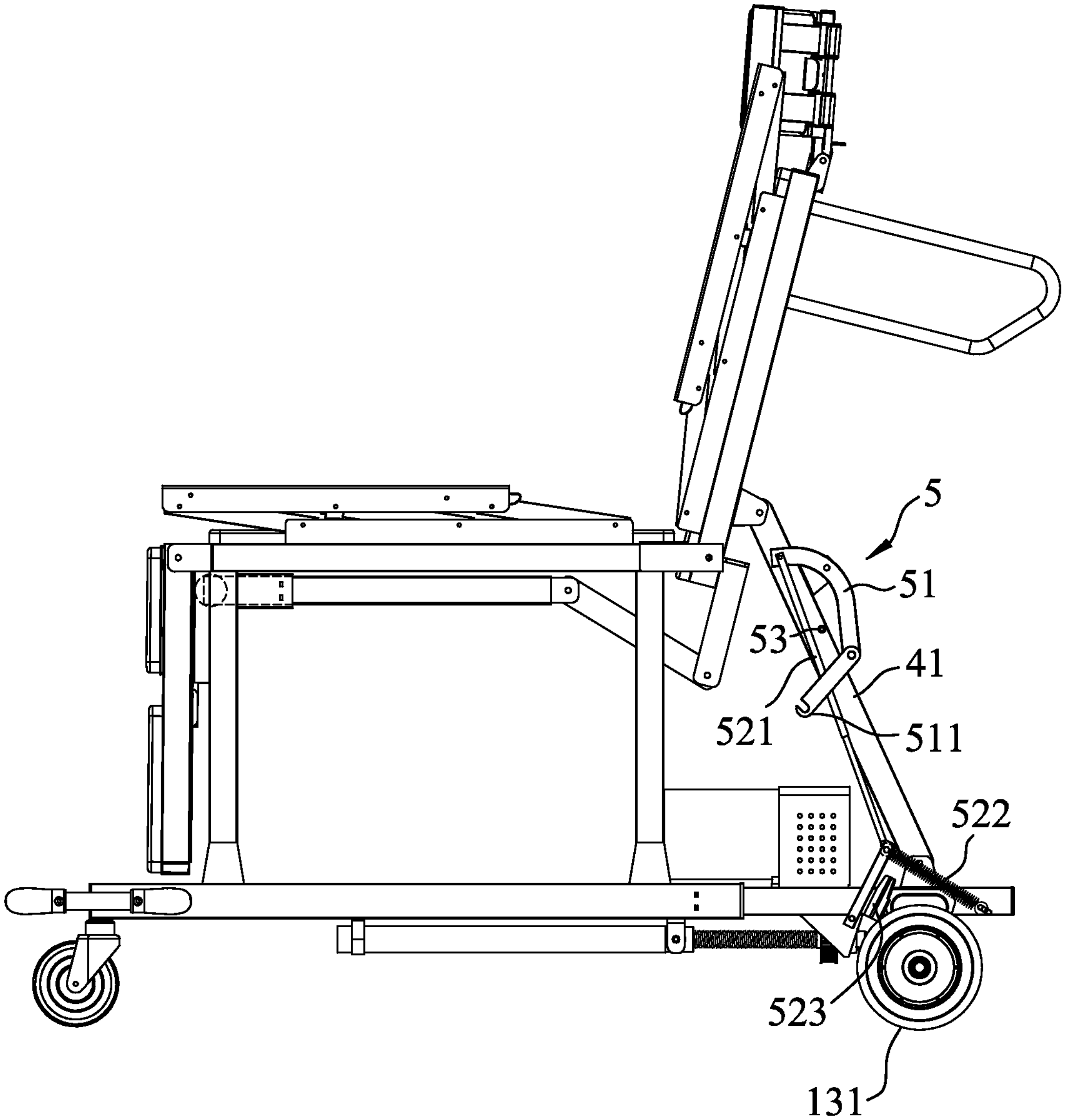
FIG. 13 is a side view illustrating a brake mechanism in a moving position, the rear protective frame body being removed.

Referring to FIGS. 12 and 13, during movement of the embodiment, the control lever 51 is operated to disengage the brake pieces 523 from the rear wheels 131. When the control lever 51 is released, the brake pieces 523 are moved downwardly by means of the biasing action of the biasing members 522 back to the braking state. In this embodiment, the brake mechanism 5 further includes two hooks 511 (only one hook 511 is shown in FIGS. 12 and 13) disposed on the control lever 51, and two studs 53 (only one stud 53 is shown in FIGS. 12 and 13) disposed on the inclined brackets 41 and engageable with the hooks 511 to restrict movement of the transmitting rods 521 relative to the inclined brackets 41 so as to keep the braking mechanism 5 to a movable state.

Figure 14:
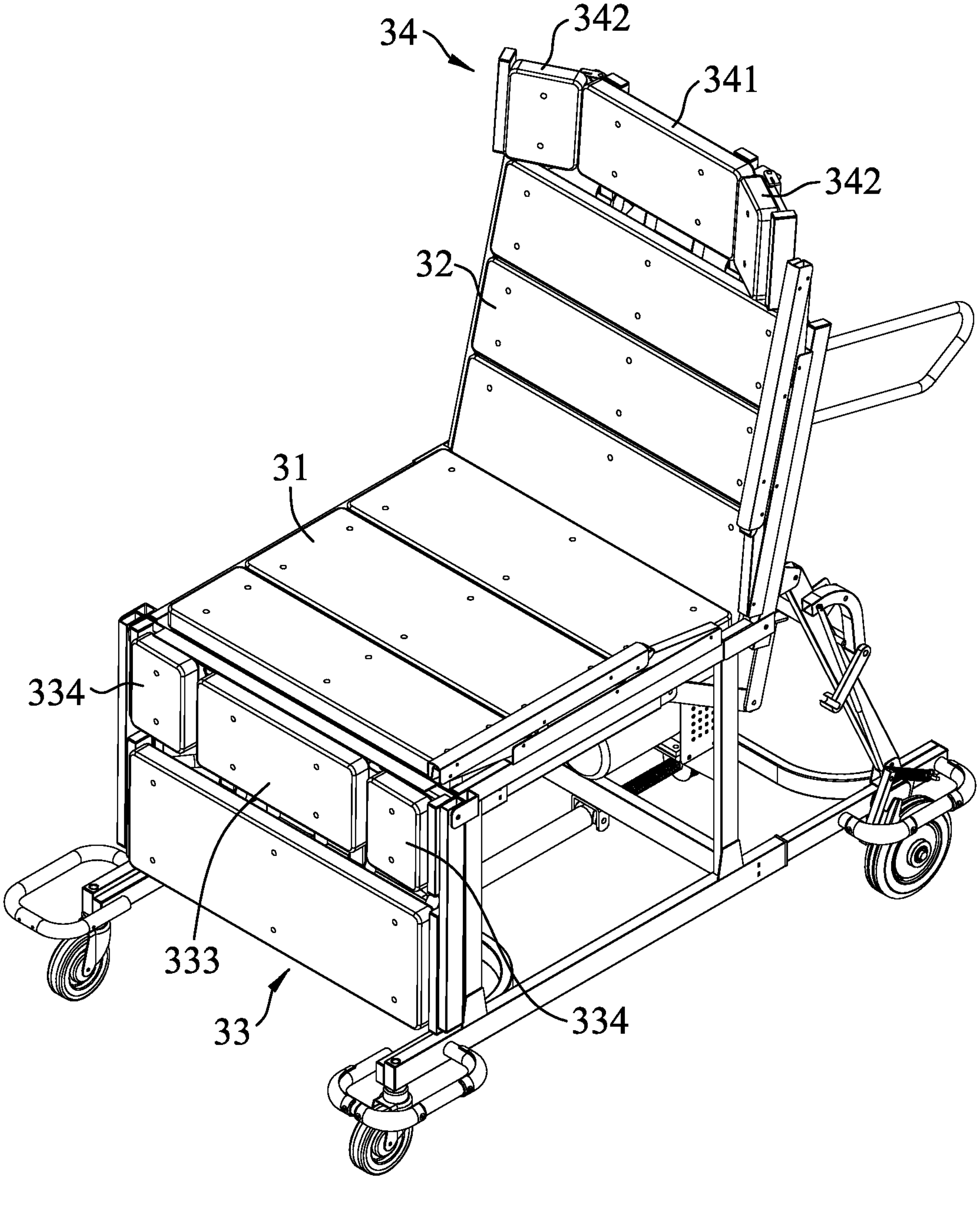
FIG. 14 is a perspective view illustrating the embodiment in the wheelchair state and the lateral wing portions inclined relative to the headrest portion.

Referring to FIGS. 8, 10 and 14, the operator can pull the positioning block 363 of the adjusting unit 36 to engage the positioning block 363 with the selected one of the positioning grooves 362, and then the headrest 34 is retained to the backrest 32 at a desired inclined angle with the first biasing member 364. Further, the positioning block 348 of each lateral wing portion 342 can be pulled to engage with the selected one of the positioning grooves 351, and then the lateral wing portions 342 are retained to the headrest portion 341 at a desired inclined angle with the second biasing members 349. Hence, when a patient is sitting on the wheeled nursing and medical device in the wheelchair state, the head of the patient can be restrained between the lateral wing portions 342.

Moreover, in this embodiment, the leg rest plate 33 includes a leg rest portion 333 and two lateral wing portions 334 which are respectively and adjustably connected with left and right sides of the leg rest portion 333 so that an inclined angle of the lateral wing portions 334 relative to the leg rest portion 333 is adjustable in the same manner as that of the lateral wing portions 342. Thus, the legs of the patient sitting on the wheeled nursing and medical device are restrained between the lateral wing portions 334.

As illustrated, with the driving module 2 and the linking mechanism 4 cooperating with the wheeled seat mechanism 1, the wheeled nursing and medical device of the present invention is shiftable between the bed state and the wheelchair state. In the wheelchair state, the distance (w2) between the front and rear wheel assemblies 12, 13 is smaller than the distance (w1) therebetween in the bed state such that the entire length of the device can be efficiently shortened, which renders traveling of the device in the wheelchair state convenient. Transportation of a patient from the nursing and medical device to a wheelchair is not required. Furthermore, the inclined angle of the headrest plate 34 relative to the backrest plate 32 is adjustable to an appropriate inclination.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A wheeled nursing and medical device comprising:

a wheeled seat mechanism including an expandable base frame which extends in a lengthwise front-rear direction, a front wheel assembly which is mounted on a front side of said expandable base frame, and a rear wheel assembly which is mounted on a rear side of said expandable base frame and spaced apart from said front wheel assembly;

a driving module mounted on said expandable base frame and operable to drive expanding and retraction of said expandable base frame in the lengthwise front-rear direction;

a bed mechanism including a main bed plate which is securely mounted on said wheeled seat mechanism, and a backrest plate which is pivotally connected with a rear side of said main bed plate to be turnable upwardly relative to said main bed plate; and a linking mechanism including at least one inclined bracket which has lower and upper ends that are respectively and pivotally connected with said rear side of said expandable base frame and a front side of said backrest plate, wherein, when said driving module is operated to drive the retraction of said expandable base frame, said rear wheel assembly is moved forwardly relative to said front wheel assembly while said lower end of said at least one inclined bracket is moved forwardly to bring said upper end of said inclined bracket to press and turn said backrest plate upwardly so as to shift said wheeled nursing and medical device from a bed state, where said backrest plate is placed parallel to and flush with said main bed plate, to a wheelchair state.

2. The wheeled nursing and medical device as claimed in claim 1, wherein said bed mechanism further includes a leg rest plate which is pivotally connected with a front side of said main bed plate to be turnable downwardly relative to said main bed plate, said linking mechanism further including a linking assembly which is mounted on an underside of said bed mechanism, said linking assembly having a linking plate which is securely mounted on said front side of said backrest plate and extends forwardly below said main bed plate, a pivot shaft which is pivotally connected with a front end of said linking plate, a linking bar which is pivotally connected with a front end of said pivot shaft and slidably engaged with said main bed plate and said leg rest plate in the lengthwise front-rear direction, wherein, in the bed state, said linking bar extends in the lengthwise front-rear direction and projects under said leg rest plate to brace said leg rest plate so as to bring said leg rest plate parallel to said main bed plate, and, during shifting to the wheelchair state, said front end of said linking plate is turned downwardly to bring said linking bar through said pivot shaft to move rearwardly so as to release bracing of said leg rest plate to permit downward swinging of said leg rest plate.

3. The wheeled nursing and medical device as claimed in claim 1, wherein said bed mechanism further includes a headrest plate which is connected with a rear side of said backrest plate, said headrest plate having a headrest portion which is adjustably connected with said backrest plate so that an inclined angle of said headrest portion relative to said backrest plate is adjustable, and two lateral wing portions which are respectively and adjustably connected with left and right sides of said headrest portion so that an inclined angle of said lateral wing portions relative to said headrest portion is adjustable.

4. The wheeled nursing and medical device as claimed in claim 1, wherein said rear wheel assembly has two rear wheels which are mounted on said rear side of said expandable base frame and symmetric to each other in a left-right direction, said linking mechanism including two of said inclined brackets which are respectively mounted on left and right sides of said expandable base frame and symmetric to each other in the left-right direction, said wheeled nursing and medical device further comprising a brake mechanism, said brake mechanism including a control lever which is pivotally connected with said inclined brackets to be turned downwardly, and two brake assemblies which are disposed at left and right ends of said control lever, each of said brake assemblies having a brake piece which abuts against a respective one of said rear wheels, a transmitting rod which is pivotally connected with said control lever and said brake piece to be moved upwardly with downward turning of said control lever to disengage said brake piece from said rear wheel, and a biasing member which is connected between said transmitting rod and said expandable base frame to bias said transmitting rod downwardly.

5. The wheeled nursing and medical device as claimed in claim 4, wherein said brake mechanism further includes two hooks disposed on said control lever, and two studs disposed on said inclined brackets and engageable with said hooks to restrict movement of said transmitting rods relative to said inclined brackets.

6. The wheeled nursing and medical device as claimed in claim 1, wherein said front wheel assembly has two front wheels which are mounted on said front side of said expandable base frame and symmetric to each other in a left-right direction, said rear wheel assembly having two rear wheels which are mounted on said rear side of said expandable base frame and symmetric to each other in the left-right direction, said expandable base frame including a fixed frame body on which said front wheels are mounted, an expandable frame body which is connected with and movable relative to said fixed frame body in the lengthwise front-rear direction and on which said rear wheels are mounted, a plurality of erecting posts which are securely connected between said fixed frame body and said main bed plate, two front protective frame bodies which are mounted on a front side of said fixed frame body and respectively surround said front wheels, and two rear protective frame bodies which are mounted on a rear side of said expandable frame body and respectively surround said rear wheels.

7. The wheeled nursing and medical device as claimed in claim 6, wherein said fixed frame body includes two fixed tubular sleeves which are spaced apart from each other in the left-right direction, and at least one fixed crosspiece which is connected between said fixed tubular sleeves, said expandable frame body including two movable tubes which are spaced apart from each other in the left-right direction and respectively and movably inserted into said fixed tubular sleeves in the lengthwise front-rear direction, and a connecting crosspiece which is connected between said movable tubes, wherein, during the shifting of said wheeled nursing and medical device from the bed state to the wheelchair state, said movable tubes are moved forwardly relative to said fixed tubular sleeves to shorten a length of said expandable base frame, and a distance length between said rear wheel assembly and said front wheel assembly is shortened thereby.

8. The wheeled nursing and medical device as claimed in claim 7, wherein said driving module includes a fixed tube which is securely mounted on said fixed frame body, a threaded shaft which is threadedly engaged with said fixed tube to be rotatable and movable relative to said fixed tube in the lengthwise front-rear direction, and a driving member which is mounted on said expandable frame body and coupled with said threaded shaft to be operable to drive rotation and movement of said threaded shaft such that said movable tubes are movable forwardly and synchronously to shorten the length of said expandable base frame to shift said wheeled nursing and medical device from the bed state to the wheelchair state.

9. The wheeled nursing and medical device as claimed in claim 1, wherein said bed mechanism further includes two armrests which are foldably mounted on two opposite sides of said main bed plate and said backrest plate.

* * * * *